(12) United States Patent
Dooley et al.

(10) Patent No.: US 9,109,140 B2
(45) Date of Patent: Aug. 18, 2015

(54) MIXED ORGANOSILOXANE NETWORKS FOR TUNABLE SURFACE PROPERTIES FOR BLANKET SUBSTRATES FOR INDIRECT PRINTING METHODS

(71) Applicant: XEROX CORPORATION, Norwalk, CT (US)

(72) Inventors: Brynn Mary Dooley, Toronto (CA); Carolyn P. Moorlag, Mississauga (CA); Anthony James Wigglesworth, Oakville (CA); Adrien Pierre Cote, Clarkson (CA); Yu Qi, Oakville (CA); Barkev Keoshkerian, Thornhill (CA)

(73) Assignee: XEROX CORPORATION, Norwalk, CT (US)

( * ) Notice: Subject to any disclaimer, the term of this patent is extended or adjusted under 35 U.S.C. 154(b) by 317 days.

(21) Appl. No.: 13/746,634

(22) Filed: Jan. 22, 2013

(65) Prior Publication Data

US 2014/0204159 A1 Jul. 24, 2014

(51) Int. Cl.
*B41J 2/01* (2006.01)
*C09D 183/04* (2006.01)
(Continued)

(52) U.S. Cl.
CPC ............ *C09D 183/04* (2013.01); *B41J 2/0057* (2013.01); *B41J 2/2107* (2013.01); *B41J 2002/012* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ....................... 347/100, 95, 101, 103, 88, 99; 106/31.13, 31.6, 31.27; 523/160, 161
See application file for complete search history.

(56) References Cited

U.S. PATENT DOCUMENTS 5,389,958 A 2/1995 Bui et al.
5,399,652 A * 3/1995 Bindl et al. ...................... 528/26
(Continued)

OTHER PUBLICATIONS

U.S. Appl. No. 13/847,195, filed Mar. 19, 2013 to Brynn Dooley et al.

*Primary Examiner* — Manish S Shah
(74) *Attorney, Agent, or Firm* — Pillsbury Winthrop Shaw Pittman LLP

(57) ABSTRACT

A crosslinked siloxane composition contains the polymerization product of a mixture containing from about 2 to about 12 alkoxysilane precursor materials, where at least one of the alkoxysilane precursor materials is a hydrophilic alkoxysilane precursor material, and at least one of the alkoxysilane precursor materials is a hydrophobic alkoxysilane precursor material. A method of printing an image to a substrate involves applying an inkjet ink to an intermediate transfer member using an inkjet printhead, spreading the ink onto the transfer member, inducing a property change of the ink, and transferring the ink to a substrate, where the intermediate transfer member comprises a crosslinked siloxane composition containing the polymerization product of a mixture comprising from about 2 to about 12 alkoxysilane precursor materials, where at least one of the precursor materials is hydrophilic and at least one is hydrophobic.

8 Claims, 1 Drawing Sheet

(51) Int. Cl.
  *B41J 2/005*  (2006.01)
  *B41J 2/21*  (2006.01)

(56) References Cited

U.S. PATENT DOCUMENTS

| | | | |
|---|---|---|---|
| 5,702,509 A * | 12/1997 | Pellerite et al. | 106/287.19 |
| 7,226,982 B2 | 6/2007 | Yamaya et al. | |
| 7,810,922 B2 * | 10/2010 | Gervasi et al. | 347/103 |
| 7,842,753 B2 | 11/2010 | Yamaya et al. | |
| 2004/0063013 A1 * | 4/2004 | Hongo et al. | 430/59.1 |
| 2004/0125169 A1 | 7/2004 | Nakagawa et al. | |
| 2007/0123606 A1 | 5/2007 | Toma et al. | |
| 2009/0043025 A1 | 2/2009 | Tsujimoto et al. | |
| 2009/0046125 A1 | 2/2009 | Nystrom et al. | |
| 2012/0242749 A1 | 9/2012 | Moorlag et al. | |

* cited by examiner

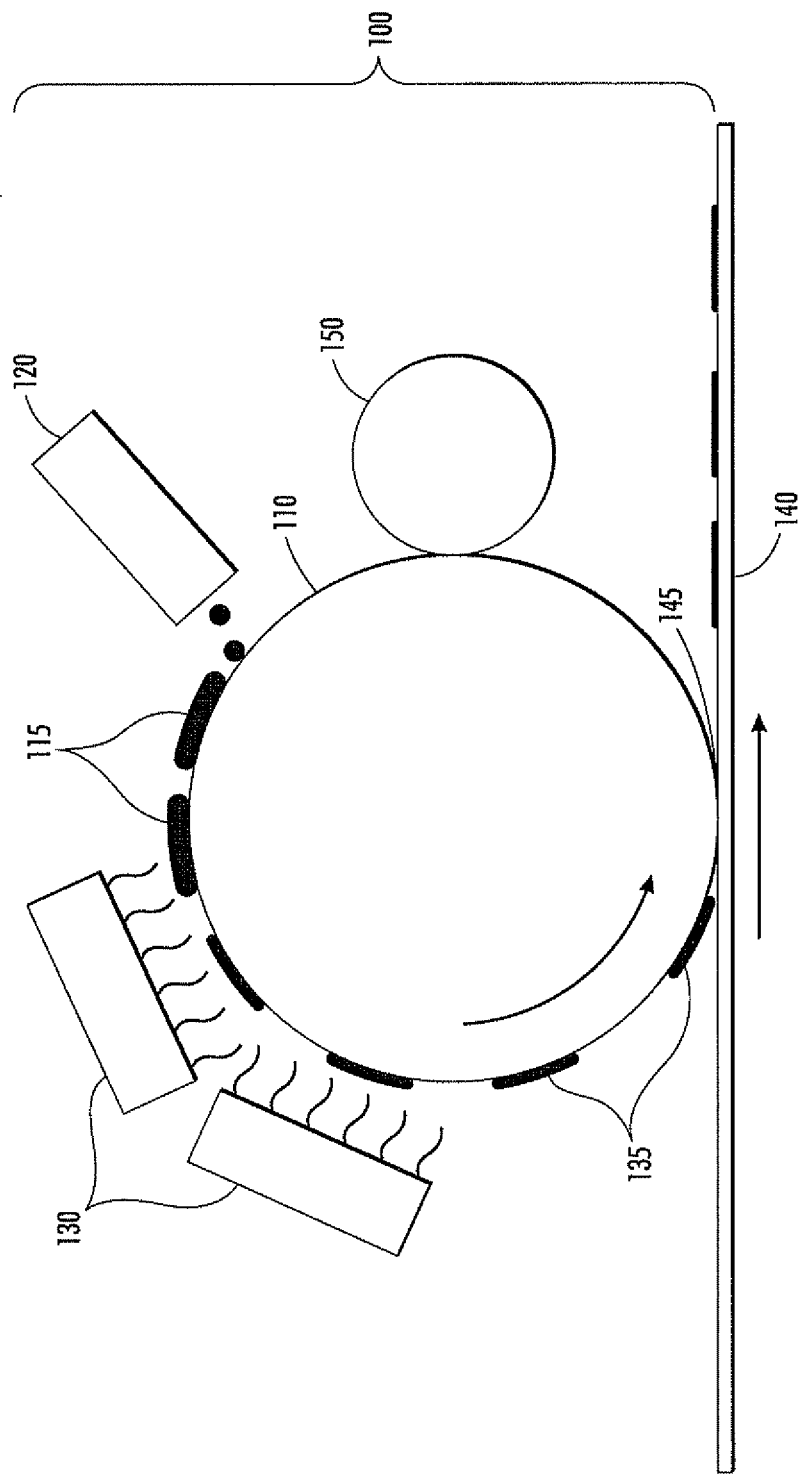

US 9,109,140 B2

MIXED ORGANOSILOXANE NETWORKS FOR TUNABLE SURFACE PROPERTIES FOR BLANKET SUBSTRATES FOR INDIRECT PRINTING METHODS

TECHNICAL FIELD

The present disclosure is generally related to indirect printing methods, and more specifically, to intermediate transfer members and processes involving intermediate transfer members.

BACKGROUND

Indirect printing methods generally include a two-step printing process involving first applying ink imagewise onto an intermediate transfer member (such as a drum or a belt) using an inkjet printhead to form a transient image, and then transferring the transient image to a substrate. When the ink is applied onto the intermediate transfer member (also called, for example, an intermediate receiving member, a blanket, or a transfix blanket), it wets or spreads to form a transient image. The transient image then undergoes a change in properties (such as partial or complete drying, thermal or photo-curing, gelation, and so forth), and is transferred to the substrate. An exemplary offset or indirect printing process is disclosed in U.S. Pat. No. 5,389,958, the disclosure of which is incorporated herein by reference.

Intermediate transfer members suitable for use in indirect printing desirably exhibit surface properties (such as energy, topology, and so forth) that meet the sub-system requirements of the inkjet/transfix printing architecture, including wetting of the ink and subsequently (such as after phase change or the like) transferring the transient image (that is, the residual ink film along with pigment) onto a substrate. Several classes of materials may be used to form intermediate transfer members, including silicone, fluorosilicone, and Viton. However, these are hydrophobic materials, and the inherent low surface tension of these materials precludes wetting of aqueous ink drops. A higher surface tension material may be used to form the intermediate transfer member, but the high surface tension of such materials would impede efficient transfer of the image from the intermediate transfer member.

Because the surface free energy requirements of the intermediate transfer member desirable for wetting the ink are different than those for transferring the transient image, intermediate transfer members that display good wettability do not efficiently transfer the ink film onto a substrate, and conversely, intermediate transfer members that efficiently transfer the image to the substrate do not wet the ink. Thus, to date, intermediate transfer members have not enabled both functions (that is, both wetting and transfer).

SUMMARY

The present disclosure provides a crosslinked siloxane composition containing a polymerization product of a mixture containing from about 2 to about 12 alkoxysilane precursor materials, where at least one of the alkoxysilane precursor materials is a hydrophilic alkoxysilane precursor material, and at least one of the alkoxysilane precursor materials is a hydrophobic alkoxysilane precursor material.

The present disclosure also provides a method of preparing an intermediate transfer member, involving mixing a coating solution containing from about 2 to about 12 alkoxysilane precursor materials, sol-gel polymerizing the materials, depositing the liquid coating formulation on a substrate, and curing the liquid coating formulation. At least one of the alkoxysilane precursor materials may be a hydrophilic alkoxysilane precursor material, and at least one of the alkoxysilane precursor materials may be a hydrophobic alkoxysilane precursor material.

The present disclosure further provides a method of printing an image to a substrate, involving applying an inkjet ink to an intermediate transfer member using an inkjet printhead, spreading the ink onto the intermediate transfer member, inducing a property change of the ink, and transferring the ink to a substrate. The intermediate transfer member may contain a crosslinked siloxane composition containing a polymerization product of a mixture containing from about 2 to about 12 alkoxysilane precursor materials. At least one of the alkoxysilane precursor materials may be a hydrophilic alkoxysilane precursor material, and at least one of the alkoxysilane precursor materials may be a hydrophobic alkoxysilane precursor material.

BRIEF DESCRIPTION OF THE DRAWINGS

FIG. 1 is a schematic representation of a two-step printing process.

EMBODIMENTS

In this specification and the claims that follow, singular forms such as "a," "an," and "the" include plural forms unless the content clearly dictates otherwise.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The terms "hydrocarbon" and "alkane" refer, for example, to branched and unbranched molecules having the general formula $C_nH_{2n+2}$, in which n is a number of 1 or more, such as from about 1 to about 60, or from about 2 to about 30, or from about 4 to about 20. Exemplary alkanes include methane, ethane, n-propane, isopropane, n-butane, isobutene, tort-butane, octane, decane, tetradecane, hexadecane, eicosane, tetracosane, and the like. Alkanes may be substituted by replacing hydrogen atoms with one or more functional groups to form alkane derivative compounds.

The term "functional group" refers, for example, to a group of atoms arranged in a way that determines the chemical properties of the group and the molecule to which it is attached. Examples of functional groups include halogen atoms, hydroxyl groups, carboxylic acid groups, and the like.

The present disclosure provides a crosslinked siloxane composition, where the composition is the polymerization product of a mixture comprising from about 2 to about 12 alkoxysilane precursor materials, such as from about 2 to about 10 alkoxysilane precursor materials, or from about 2 to about 8 alkoxysilane precursor materials. In embodiments, at least one of the alkoxysilane precursor materials is a hydrophilic alkoxysilane precursor material, while at least one of the alkoxysilane precursor materials is a hydrophobic precursor material.

Organosiloxane networks (OSN) are highly crosslinked materials containing organic segments bound together via siloxane linkages. These materials exhibit high thermal robustness, high mechanical strength, and tunable surface energy, and the surface and mechanical properties of the OSN can be tailored for particular applications by selecting suitable building blocks and coating formulation. That is to say, the organosiloxane networks according to the instant disclosure are tunable materials whose properties (including, for example, surface free energy) can be varied through the selection of the type and amount of particular precursors used to produce the OSN.

The compositions according to the instant disclosure contain both hydrophilic and hydrophobic moieties, resulting in hydrophilic and hydrophobic domains in the crosslinked siloxane composition. The crosslinked siloxane compositions of the instant disclosure are readily tunable, and the distribution and loading level of the hydrophobic and hydrophilic precursor materials may be adjusted to balance between wetting ability and transfer capabilities of an intermediate transfer member used in an indirect printing process. The system may be further controlled through solvent selection, the number and reactivity of the alkoxy groups on the silane, and the processing conditions. By tuning the hydrophobic and hydrophilic precursor content in the OSN, the surface free energy of the OSNs in the intermediate transfer members of the instant disclosure may be adjusted to differing surface energies, and the surface release properties of the intermediate transfer members may be tailored to provide an enabling surface with an array of wetting properties available for the changing physical characteristics of the ink as wetting progresses through jetting, spreading, and transfer.

Indirect Printing

FIG. 1 shows one embodiment of a printing apparatus according to the present disclosure. The printing apparatus 100 comprises an intermediate transfer member 110. In the illustrated embodiment, the intermediate transfer member is a cylinder (such as a drum); however, the intermediate transfer member may be in alternate forms. For example, the intermediate transfer member may be in the form of an endless flexible belt, a web, a flexible drum or roller, a rigid roller or cylinder, a sheet, a drelt (a cross between a drum and a belt), a seamless belt, that is with an absence of any seams or visible joints in the members, and the like.

In some embodiments, the intermediate transfer member 110 rotates counterclockwise. The apparatus includes an inkjet printhead 120, which applies ink imagewise onto the intermediate transfer member 110. The ink wets and spreads on the intermediate transfer member 110 to form the transient image 115. The transient image 115 then undergoes a change in properties (such as partial or complete drying, thermal or photo-curing, gelation, and so forth). The change in properties may be induced, for example, by a property-change device 130. The property-change device 130 may be any suitable device which may induce a change in properties in the transient image 115. Potentially suitable property-change devices may include, for example, a device that irradiates light, such as a UV lamp or an ultraviolet LD (laser diode) array, or a chiller or an air-cooling device, or a heat source, such as a heat lamp, an optical heating device such as a laser or an LED bar, a thermal print head, resistive heating fingers, or a microheater array, or the like.

After the image undergoes a change in properties, the resulting post-phase-change transient image 135 may be transferred to a recording medium or printing substrate 140. Potentially suitable recording media or printing substrates may include paper, substrate, transparency material such as polyester, polycarbonate, and the like, cloth, wood, and any other desired material upon which an image may be situated. The intermediate transfer member 110 may undergo a change in properties to further enable transfer. In the depicted embodiment, the recording medium or printing substrate 140, such as paper, may be fed to a nip region 145 in the direction of the arrow. The ink image may then be transferred from the intermediate transfer member 110 to the printing substrate 140. A cleaning unit 150 may clean the intermediate transfer member 110 of any residual ink, dust, or other materials after transfer of the ink images has been completed.

In embodiments, an indirect printing process according to the instant disclosure may use an intermediate transfer member comprising a crosslinked siloxane composition, wherein the crosslinked siloxane composition is the polymerization product of a mixture comprising from about 2 to about 12 alkoxysilane precursor materials, such as from about 2 to about 10 alkoxysilane precursor materials, or from about 2 to about 8 alkoxysilane precursor materials. At least one of the alkoxysilane precursor materials may be a hydrophilic alkoxysilane precursor material, and at least one of the alkoxysilane precursor materials is a hydrophobic alkoxysilane precursor material. In embodiments, the surface release properties of the intermediate transfer member may be tailored by adjusting the content of the hydrophobic and hydrophilic moieties in the crosslinked siloxane composition. For example, in embodiments, the surface free energy of the crosslinked siloxane composition is tunable, and can range, for example, from about 55 mN/m to about 5 mN/m, such as from about 45 mN/m to about 7 mN/m, or from about 35 mN/m to about 10 mN/m.

Intermediate Transfer Member

An intermediate transfer member suitable for the above-two step printing process desirably has surface properties (such as energy, topology, and so forth) both to enable wetting of the ink and to enable complete transfer of the transient image (residual ink film along with pigment) onto a substrate. For the ink to wet well (i.e., spread) onto the intermediate transfer member, the surface free energy of the intermediate transfer member is desirably higher than the surface tension of the liquid ink. For the ink to subsequently be transferred from the intermediate transfer member to the substrate, the surface free energy of the intermediate transfer member is desirably lower than the surface free energy of the dry (resin) ink.

As a general matter, the wettability or spread of a liquid on a surface is governed by the forces of interaction between the liquid, the surface, and the surrounding air, and in particular the surface free energy, as relating to the surface chemistry and surface topology. Surface tension is a parameter that can be described as the interaction between the forces of cohesion and the forces of adhesion, which determines whether or not wetting, or the spreading of liquid across a surface, occurs.

Young's Equation, which defines the balance of forces caused by a wet drop on a dry surface, is written as:

$$\gamma_{SL} + \gamma_{LV} \cos\theta = \gamma_{SV}$$

where $\gamma_{SL}$ are the forces of interaction between a solid and liquid; $\gamma_{LV}$ are the forces of interaction between a liquid and surrounding air; $\gamma_{SV}$ are the forces of interaction between a solid and surrounding air; and $\theta$ is the contact angle of the drop of liquid in relation to the surface. Young's Equation also indicates that, if the surface tension of the liquid is lower than the surface energy, the contact angle is zero and the liquid wets the surface. The surface energy depends on several factors, such as the chemical composition and crystallographic structure of the solid, and in particular of its surface, the geometric characteristics of the surface and its roughness, and the presence of molecules physically adsorbed or chemically bonded to the solid surface.

According to the instant disclosure, the crosslinked siloxane composition is the polymerization product of from about 2 to about 12 alkoxysilane precursor materials, such as from about 2 to about 10 alkoxysilane precursor materials, or from about 2 to about 8 alkoxysilane precursor materials. In embodiments, at least one of the alkoxysilane precursor materials is a hydrophilic alkoxysilane precursor material, and at least one of the alkoxysilane precursor materials is a hydrophobic alkoxysilane precursor material.

The term hydrophobic (superhydrophobic) refers, for example, to the property of repelling water, or other polar species, such as methanol. Furthermore, hydrophobic implies an inability to form strong hydrogen bonds to water or other hydrogen bonding species. Hydrophobic materials are typically characterized by having water contact angles greater than 90° as measured using a contact angle goniometer or related device. Highly hydrophobic as used herein can be described as when a droplet of water forms a high contact angle with a surface, such as a contact angle of from about 130° to about 180°. Superhydrophobic as used herein can be described as when a droplet of water forms a high contact angle with a surface, such as a contact angle of greater than about 150°, or from greater about 150° to about 180°.

The term hydrophilic refers, for example, to the property of attracting, adsorbing, or absorbing water or other polar species, or a surface. Hydrophilicity is further characterized by being able to form strong or numerous hydrogen bonds to water or other hydrogen bonding species. Hydrophilic materials are typically characterized by having water contact angles less than about 20° as measured using a contact angle goniometer or related device.

In embodiments, the hydrophobic precursors may independently vary in their number of alkoxy substitutions. For example, in embodiments, the hydrophobic alkoxysilane precursor materials may be independently selected from monofunctional, difunctional, or trifunctional alkoxysilanes. For example, in embodiments, the hydrophobic alkoxysilane precursor materials may be monofunctional alkoxysilanes, such as trimethylmethoxysilane; difunctional alkoxysilanes such as dimethyldimethoxysilane, diphenyldimethoxysilane or methylphenyl-dimethoxysilane; or trifunctional alkoxysilanes such as methyltrimethoxysilane, methyltriethoxysilane, ethyltrimethoxysilane, methyltrimethoxyethoxysilane, vinyltrimethoxysilane, vinyltriethoxysilane, phenyltrimethoxysilane, γ-glycidoxy-propylmethyldiethoxysilane, γ-glycidoxypropyltrimethoxysilane, γ-glycidoxy-propyltriethoxysilane, γ-aminopropyltriethoxysilane, γ-aminopropyltrimethoxysilane, γ-aminopropylmethyldimethoxysilane, N-β-(aminoethyl)-γ-aminopropyltriethoxy-silane, (tridecafluoro-1,1,2,2-tetrahydrooctyl)triethoxysilane, (3,3,3-trifluoropropyl)-trimethoxysilane, 3-(heptafluoroisopropoxy)propyltriethoxysilane, 1H,1H,2H,2H-perfluoroalkyltriethoxysilane, 1H,1H,2H,2H-perfluorodecyltriethoxysilane or 1H,1H,2H,2H-perfluorooctyltriethoxysilane. In embodiments, the number and reactivity of the alkoxy groups may be selected to further control properties of the system. For example, trifunctional alkoxysilanes may be used in embodiments to improve the strength of the intermediate transfer layer, and monofunctional alkoxysilanes and difunctional alkoxysilanes may be used in embodiments in order to improve the flexibility and film-forming properties.

In embodiments, the hydrophobic alkoxysilane precursor material may be a linear or a branched hydrocarbon. In embodiments, the hydrophobic alkoxysilane precursors may include siloxylluorocarbon (SFC) precursors. SFC precursors are designed to incorporate fluorinated chains that add flexibility and low-surface energy character to the resulting material. A variety of SFC precursors with varying siloxane and fluorocarbon components may be used to prepare OSN coatings, including di- and tri-alkoxy silanes, linear and branched fluoroalkanes, and fluoroarenes.

In embodiments, the hydrophobic alkoxysilane precursor material may be represented by the structure:

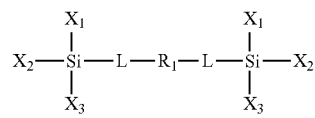

where $R_1$ is an alkyl group having from about 1 to about 30 carbons, such as from about 1 to about 20 carbons or from about 1 to about 10 carbon atoms, or an aliphatic or aromatic fluorocarbon chain; L is a $C_nH_{2n}$ linker group, where n is a number between 0 and about 10; and $X_1$, $X_2$, and $X_3$ represent reactive hydroxide functionalities, reactive alkoxide functionalities, unreactive aliphatic functionalities of from about 1 carbon atom to about 10 carbon atoms, or unreactive aromatic functionalities of from about 1 carbon atom to about 10 carbon atoms.

In addition to the monomers listed above, the hydrophobic alkoxysilane precursor may be represented by the structure:

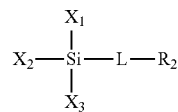

where $R_2$ may be an alkyl group having from about 1 to about 30 carbons, such as from about 1 to about 20 carbons or from about 1 to about 10 carbon atoms, or an aliphatic or aromatic fluorocarbon chain, and L, $X_1$, $X_2$, and $X_3$ are as defined above.

In embodiments, the hydrophilic alkoxysilane precursors may independently vary in their number of alkoxy substitutions. For example, in embodiments, the hydrophilic alkoxysilane precursor materials may be independently selected from monofunctional, difunctional, or trifunctional alkoxysilanes. In embodiments, the number and reactivity of the alkoxy groups may be selected to further control properties of the system. In embodiments, in order to improve the strength of the intermediate transfer layer, trifunctional alkoxysilanes may be used, and in order to improve the flexibility and film-forming properties, monofunctional alkoxysilanes and difunctional alkoxysilanes may be used.

In embodiments, the hydrophilic precursors may be linear or branched fluorocarbons containing polar functional groups including, for example, functional groups such as esters, carboxylic acids, alcohols, amides, or urethanes.

For example, in embodiments, the hydrophilic alkoxysilane precursor material may be represented by the structure:

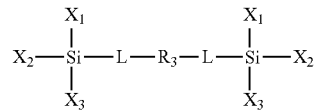

where L, $X_1$, $X_2$, and $X_3$ are as defined above, and where $R_3$ represents a linear or branched carbon chain containing at least one polar functional group selected from the group consisting of ethers, esters, carboxylic acids, alcohols, amines, amides, or urethanes, and optionally at least one aromatic functionality, such as, for example, phenyl, biphenyl, naphthyl, benzyl, phenylalkyl, and the like, and substituted aromatic functionalities, such as substituted with hydroxyl, methyl, halogen, cyanide, and the like.

In addition to the monomers listed above, the hydrophilic alkoxysilane precursors may be represented by the structure:

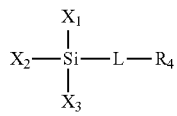

where L, $X_1$, $X_2$, and $X_3$ are as defined above, and $R_4$ represents a linear or branched carbon chain containing at least one polar functional group selected from the group consisting of ethers, esters, carboxylic acids, alcohols, amines, amides, or urethanes, and optionally at least one aromatic functionality, such as, for example, phenyl, biphenyl, naphthyl, benzyl, phenylalkyl, and the like, and substituted aromatic functionalities, such as substituted with hydroxyl, methyl, halogen, cyanide, and the like.

In addition to the monomers listed above, the siloxyfluorocarbon networked polymer may be prepared using monomers selected from the group consisting of silicon tetraalkoxide and branched pentasilanes. The silicon tetraalkoxide is represented by the respective structure:

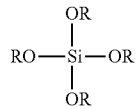

The branched pentasilanes are represented by the respective structure:

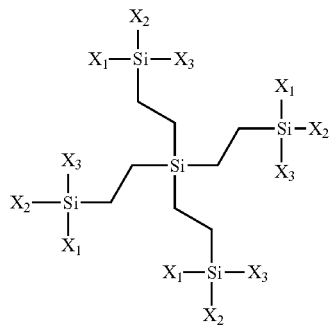

where $X_1$, $X_2$, and $X_3$ are as defined above.

The monomers may be networked together so that all monomers are molecularly bonded together in the cured coating via silicon oxide (Si—O—Si) linkages. Therefore, in embodiments, a molecular weight cannot be given for the siloxyfluorocarbon networked polymer because the coating may be crosslinked into one system.

In embodiments, the alkoxysilane precursors are processed via sol-gel processing (discussed below). In embodiments, the mole ratio of the hydrophilic alkoxysilane precursors to the hydrophobic alkoxysilane precursor materials may be from about 1:11 to about 11:1, such as from about 1:7 to about 7:1, or from about 3:5 to about 5:3, or about 1:1.

In embodiments, the ratio of the hydrophilic precursors to the hydrophobic precursors may be adjusted to control the degree or extent of wetting and release in the crosslinked siloxane composition. For example, the hydrophilic domains would enable ink wetting, while the inherent low surface tension of a hydrophobic domain would promote transfer of a polymer film to a substrate after the ink has dried. Increasing the relative amount of hydrophilic moieties may increase the number of hydrophilic domains, thereby improving wettability. Increasing the number of hydrophobic moieties may increase the prevalence of hydrophobic domains and thereby improve the transfer capabilities of the crosslinked composition.

Ink Materials

Any ink suitable for use in an indirect printing method may be used. Exemplary ink compositions include, for example, phase change inks, gel based inks, curable inks, aqueous inks, and solvent inks. As used herein, the term "ink composition" encompasses all colors of a particular ink composition including, for example, usable color sets of an ink composition. For example, an ink composition may refer to a usable color set of phase change ink that includes cyan, magenta, yellow, and black inks. Therefore, as defined herein, cyan phase change ink and magenta phase change ink are different ink colors of the same ink composition.

The term "phase change ink," also referred to as "solid ink," encompasses inks that remain in a solid phase at ambient temperature and that melt to a liquid phase when heated above a threshold temperature, referred to in some instances as a melt temperature. The ambient temperature is the temperature of the air surrounding the imaging device; however, the ambient temperature may be at room temperature (about 20° C. to about 25° C.) when the imaging device is positioned in an enclosed or otherwise defined space. Melt temperatures for phase change ink may be, for example, from about 70° C. to about 140° C., such as from about 80° C. to about 100° C., or from about 110° C. to about 130° C. When phase change ink cools below the melt temperature, the ink returns to the solid phase.

As used herein, the terms "gel ink" and "gel based ink" refer, for example, to inks that remain in a gelatinous state at the ambient temperature and that may be heated or otherwise altered to have a different viscosity suitable for ejection by a printhead. Gel ink in the gelatinous state may have a viscosity, for example, between from about $10^5$ and $10^7$-centipoise (cP); however, the viscosity of gel ink may be reduced to a liquid-like viscosity by heating the ink above a threshold temperature, referred to as a gelation temperature. The gelation temperature may be, for example from about 30° C. to about 50° C., such as from about 31° C. to about 38° C., or from about 41° C. to about 48° C. The viscosity of the gel ink increases when the ink cools below the gelation temperature.

Some ink compositions, referred to herein as curable inks, may be cured by the imaging device. As used herein, the process of "curing" ink refers to curable compounds in an ink undergoing an increase in molecular weight in response to being exposed to radiation. Exemplary processes for increasing the molecular weight of a curable compound include, for example, crosslinking and chain lengthening. Cured ink is suitable for document distribution, is resistant to smudging, and may be handled by a user. Radiation suitable to cure ink may encompass the full frequency (or wavelength) spectrum including, for example, microwaves, infrared, visible, ultraviolet, and x-rays. For instance, ultraviolet-curable gel ink, referred to herein as UV gel ink, becomes cured after being exposed to ultraviolet radiation. As, used herein, the term "ultraviolet" radiation encompasses radiation having a wavelength of from about 50 nm to about 500 nm.

In embodiments, an ink suitable for use in the above-described two-step printing process may have surface tension, viscosity, and particle size suitable for use in a piezoelectric inkjet printhead. In embodiments, the surface tension of the jettable ink may be from about 15 to about 50 dynes/cm, such as from about 18 to about 45 dynes/cm, or from about 20 to about 40 dynes/cm, or from about 22 to about 32 dynes/cm. The viscosity of the jettable inks may be, for example, from about 1 to about 30 centipoise (cps) at 30° C., such as from about 3 to about 20 cps, or from about 5 to about 18 cps, or from about 6 to about 17 cps. In embodiments, the particle size of the jettable inks may be less than about 600 nm, such as less than about 550 nm, or less than about 500 nm.

Method of Making an Intermediate Transfer Member

The crosslinked siloxane composition according to the instant disclosure may be prepared by any appropriate method. For example, the crosslinked siloxane composition may be prepared by sol-gel polymerization of the alkoxysilane precursors. The crosslinked siloxane composition may be prepared by a solution-gelation (or "sol-gel") process during which hydrolysis, followed by condensation polymerization, of the alkoxysilane precursors takes place in the presence of water and an organic solvent. A general process for forming sol-gels is discussed, for example, in C. J. Brinker & G. Scherer, Sol-Gel Science: The Physics and Chemistry of Sol-Gel Processing (Academic Press, Boston, 1990), and U.S. Patent Application Publication No. 2007/0082207, the disclosures of which are incorporated herein by reference in their entireties. This two-step reaction process, which transforms a miscible one-phase liquid solution into a two-phase material, is called "sol-gel transition." Generally, the alkoxysilane/solvent/water mixture is slow to hydrolyze. However, the hydrolysis rate is a function of the solution pH and, therefore, may be controlled by the addition of an acid or base as a catalyst. The reaction mixture can further include other materials, such as organic monomers or polymers or other additives, which can become either chemically bound into the polymer network or entrapped in the polymer structure.

The sol-gel polymerization processes according to the instant disclosure may be carried out at any suitable temperature, such as from about 25° C. to about 200° C., or from about 40° C. to about 150° C., or from about 65° C. to about 100° C.

When conducting the sol-gel processes according to the instant disclosure, a catalyst may be used to increase the rate and the extent of both the hydrolysis and condensation (polymerization) reactions. The choice of catalyst can be a protic acid or a base, in particular those that are soluble in alcohols and water. Suitable acids that can be used may be strong acids that include mineral acids such as hydrochloric acid, hydrofluoric acid, sulfuric acid, nitric acid, and the like; as well as organic acids such as acetic acid, trifluoroacetic acid, trichloroacetic acid, oxalic acid, formic acid, glycolic acid, glyoxylic acid, and the like; or a polymeric acid such as poly(acrylic acid) and its copolymers, and the like; mixtures thereof, and the like. The acid catalyst can be used at varying strengths and concentrations, however, since the kinetics of hydrolysis reaction are first-order in acid concentration, higher acid concentrations and/or higher acid strength may be used, particularly if the sol-gel polymerization process is carried out at low pH below 2, where the rate of condensation of monomers (to produce silica particles) is proportional to acid concentration.

Suitable choices of base catalysts may be proton-acceptors instead of Lewis bases, and soluble in alcohols and water, such as ammonia-water, hydroxides of Group 1 or Group 2 metals, hydroxides of alkylammonium complexes, as well as organic amine bases such as N,N-diethylaminoethanol, 1,4-diazabicyclo[2.2.2]octane, pyridine, 4-(N,N-dimethylamino)pyridine, piperidine, piperazine, pyrrolidine, morpholine, imidazole, and similar heterocyclic or non-aromatic bases. The amount of base catalyst can vary widely depending on the base strength and the relative molar ratio with the alkoxysilane precursor reagent. In embodiments, the concentration of base catalyst can range from about 0.02 to 1.0 M, and such as from about 0.05 to about 0.75 M. The molar ratio of [base:alkoxysilane] can also vary greatly depending on the process conditions that are used, and the ratio can range from about 1:1 to about 20:1 or to about 10:1.

The solvents used in preparing the coating solution may include, for example, alcohols, ketones, and esters. In embodiments, the solvents used in preparing the coating solution may be organic solvents such as methanol, ethanol, n-propanol, n-butanol, benzyl alcohol, methyl cellosolve, ethyl cellosolve, acetone, methyl ethyl ketone, cyclohexanone, chlorobenzene, methyl acetate, n-butyl acetate, dioxane, tetrahydrofuran, methylene chloride, chloroform and mixtures thereof.

In embodiments, the coating solution may be deposited on a substrate using any suitable liquid deposition technique. Exemplary methods for depositing the coating solution on the substrate include draw-down coating, spray coating, spin coating, flow coating, dipping, spraying such as by multiple spray applications of very fine thin films, casting, web-coating, roll-coating, extrusion molding, laminating, or the like. The thickness of the coating solution may be from about 5 to about 1500 microns thick, such as from about 10 to about 1200 microns, or from about 20 to about 800 microns.

Any suitable substrate may be used. In embodiments, the substrate may include, for example, metals, rubbers, and fabrics. Metals include steel, aluminum, nickel, and their alloys, and like metals and alloys of like metals. Examples of suitable rubbers include ethylene propylene dienes, fluoroelastomers, n-butyl rubbers, silicone rubbers and other elastomers and the like. A fabric material, as used herein, refers to a textile structure comprised of mechanically interlocked fibers or filaments, which may be woven or nonwoven. Fabrics are materials made from fibers or threads and woven, knitted, or pressed into a cloth or felt type structures. Woven, as used herein, refers to closely oriented by warp and filler strands at right angles to each other. Nonwoven, as used herein, refers to randomly integrated fibers or filaments. Examples of fabrics include woven or nonwoven cotton fabric, graphite fabric, fiberglass, woven or nonwoven polyimide (for example, KEVLAR™, available from DuPont), woven or nonwoven polyimide, such as nylon or polyphenylene isophthalamide (for example, NOMEX™, of E. I. DuPont of Wilmington, Del.), polyester, aramids, polycarbonate, polyacryl, polystyrene, polyethylene, polypropylene, cellulose, polysulfone, polyxylene, polyacetal, and the like, and mixtures thereof. The substrate may have a thickness of from about 1 to about 70 mm, such as from about 10 to about 65 mm, or from about 30 to about 60 mm.

Once the sol-gel polymerization process is complete, the polymerized material may be cured to form the crosslinked siloxane material. In embodiments, the coating solution may be thermally cured after the coating solution has been deposited on the substrate. The polymerized material may be cured at any suitable temperature for curing the polymers, such as for example, from about 100° C. to about 200° C., such as from about 120° C. to about 170° C., or from about 130° C. to about 150° C. Curing may be accelerated and/or enhanced by the addition of a catalyst. Suitable catalysts include, for example, aluminum (III) acetylacetonate and dibutyltin (IV) dilaurylate.

In embodiments, the crosslinked siloxane composition contains Si—O—Si linkages and both hydrophilic and hydrophobic moieties. The hydrophilic and hydrophobic moieties may be distributed in the crosslinked siloxane composition in at least two ways. In embodiments, the hydrophilic and hydrophobic moieties may be homogenously distributed within the crosslinked siloxane composition. In other embodiments, the hydrophobic and hydrophilic moieties may form phase separated domains within the crosslinked siloxane composition.

The phase separated domains may have a diameter of, for example, from, about 1 nm to about 15 µm, such as from about 3 nm to about 12 µm, or from about 4 nm to about 11 µm, or from about 5 nm to about 10 µm. The size of the domain is tunable through, for example, control of the formulation components, such as the solvent. The size of the domains may also be tuned by adjusting the processing conditions, such as the temperature.

EXAMPLES

The following examples are being submitted to illustrate embodiments of the present disclosure. These examples are intended to be illustrative only and are not intended to limit the scope of the present disclosure. Parts and percentages are by weight unless otherwise indicated.

Example 1

N-octylmethyldimethoxysilane (1 mmol, Gelest Inc.), 1,2-bis(methyldimethoxysilyl)ethane (1 mmol, Gelest Inc.), and 3-acetoxypropylmethyldimethoxysilane (1 mmol) are dissolved in n-butanol (Sigma-Aldrich). Tetrabutylammonium hydroxide catalyst (0.5 mol % relative to Si) of a 1.0 M solution in MeOH (Sigma-Aldrich) and water (1 molar equivalent per Si) are added, yielding a 60 wt % solution. The formulation is mixed by vortex mixing (2500 rpm, 10 s), filtered through a 0.45 µm PTFE filter. The liquid coating formulation is coated on polyimide substrate (Upilex®-S, Ube Industries, Ltd.) by draw-down coating and cured at 140° C. for 30 minutes, yielding a continuous OSN film.

Example 2

3,3,3-trifluoropropylmethyldimethoxysilane (2 mmol, Gelest Inc.), 1,2-bis(methyldimethoxysilyl)ethane (1 mmol, Gelest Inc.) and 3-acetoxypropylmethyldiethoxysilane (1 mmol, Gelest Inc.) are dissolved in n-butanol (Sigma-Aldrich). Tetrabutylammonium hydroxide catalyst (0.5 mol % relative to Si) of a 1.0 M solution in MeOH (Sigma-Aldrich) and water (1 molar equivalent per Si) are added, yielding a 60 wt % solution. The formulation is mixed by vortex mixing (2500 rpm, 10 s), filtered through a 0.45 µm PTFE filter. The liquid coating formulation is coated on polyimide (Upilex®-S, Ube Industries, Ltd.) substrate by draw-down coating and cured at 140° C. for 30 minutes, yielding a continuous OSN film.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A crosslinked siloxane composition comprising a polymerization product of a mixture comprising from about 2 to about 12 alkoxysilane precursor materials;
    wherein
        at least one of the alkoxysilane precursor materials is a hydrophilic alkoxysilane precursor material; and
        at least one of the alkoxysilane precursor materials is a hydrophobic alkoxysilane precursor material and further wherein the hydrophilic alkoxysilane precursor material and the hydrophobic alkoxysilane precursor material form phase separated domains in the crosslinked siloxane composition and wherein the phase separated domains are from about 5 nm to about 10 µm in diameter.

2. The crosslinked siloxane composition according to claim 1, wherein the crosslinked siloxane composition is the polymerization product of a mixture of from about 2 to about 8 alkoxysilane precursor materials.

3. The crosslinked siloxane composition according to claim 1, wherein the hydrophilic alkoxysilane precursor material and the hydrophobic alkoxysilane precursor material are homogenously distributed in the crosslinked siloxane composition.

4. The crosslinked siloxane composition according to claim 1, wherein the mole ratio of hydrophilic alkoxysilane precursor materials to hydrophobic alkoxysilane precursor materials is from about 1:7 to about 7:1.

5. The crosslinked siloxane composition according to claim 1, wherein the at least one hydrophilic alkoxysilane precursor material is selected from the group consisting of linear fluorocarbons containing polar functional groups and branched fluorocarbons containing polar functional groups, wherein the polar functional groups are selected from the group consisting of ethers, esters, carboxylic acids, alcohols, amines, amides, and urethanes.

6. The crosslinked siloxane composition according to claim 1, wherein the at least one hydrophobic alkoxysilane precursor material is selected from the group consisting of linear hydrocarbons, branched hydrocarbons, linear fluoroalkanes, branched fluoroalkanes, and fluoroarenes.

7. An intermediate transfer member comprising the crosslinked siloxane composition according to claim 1.

8. A printing apparatus comprising a transfer member according to claim 7.

* * * * *